(12) United States Patent
Jaramillo-Velasquez et al.

(10) Patent No.: US 10,621,501 B2
(45) Date of Patent: Apr. 14, 2020

(54) METHOD FOR CONDITION MONITORING OF A DISTRIBUTED DRIVE-TRAIN

(71) Applicant: ABB TECHNOLOGY AG, Zurich (CH)

(72) Inventors: Victor-Hugo Jaramillo-Velasquez, Medellin (CO); Pawel Rzeszucinski, Kedzierzyn-Kozle (PL); James Ottewill, Middlesex (GB); Michal Orkisz, Cracow (PL)

(73) Assignee: ABB TECHNOLOGY AG, Zurich (CH)

( * ) Notice: Subject to any disclaimer, the term of this patent is extended or adjusted under 35 U.S.C. 154(b) by 718 days.

(21) Appl. No.: 14/909,788

(22) PCT Filed: Jul. 22, 2014

(86) PCT No.: PCT/EP2014/002030
§ 371 (c)(1),
(2) Date: Feb. 3, 2016

(87) PCT Pub. No.: WO2015/018500
PCT Pub. Date: Feb. 12, 2015

(65) Prior Publication Data
US 2016/0189050 A1 Jun. 30, 2016

(30) Foreign Application Priority Data
Aug. 5, 2013 (EP) .................................... 13460053

(51) Int. Cl.
*G06N 7/00* (2006.01)
*G05B 23/02* (2006.01)
*G06N 5/04* (2006.01)

(52) U.S. Cl.
CPC ........... *G06N 7/005* (2013.01); *G05B 23/024* (2013.01); *G06N 5/048* (2013.01)

(58) Field of Classification Search
CPC .............................. G06N 7/005; G05B 23/024
See application file for complete search history.

(56) References Cited

U.S. PATENT DOCUMENTS

| 6,981,423 | B1* | 1/2006 | Discenzo | .................. G01L 3/12 |
| | | | | 73/800 |
| 7,539,549 | B1 | 5/2009 | Discenzo et al. | ................ 700/28 |
| 2006/0235707 | A1 | 10/2006 | Goldstein et al. | ................. 705/1 |

OTHER PUBLICATIONS

Fraichard, et al., "Multi-Sensor Data Fusion Using Bayesian Programming: and Automotive Application", 2002 IEEE Inteligent Vehicle Symposium, Jun. 17-21, 2002 (Year: 2002).*

(Continued)

*Primary Examiner* — Li B. Zhen
*Assistant Examiner* — Tsu-Chang Lee
(74) *Attorney, Agent, or Firm* — Renner Kenner Greive Bobak Taylor & Weber (57) ABSTRACT

A method for condition monitoring of distributed drive-trains using Bayesian data fusion approach for measured data includes measurement of physical signals obtained from sensors attached to the components being chosen from the drive-train which are delivered to the computer means for processing the measured data and performing data fusion processes, using a data from information database containing at least one information system. The method is characterized by comprising two stages for data fusion processes performed by using Bayesian Inference, the first one for local data fusion process and the second one for global data fusion process, and on the basis of the second stage the assessment process of the condition of the drive-train is performed by choosing the maximum value of the received data, which maximum value serves as an indicator for the most likely fault present in the drive-train.

6 Claims, 7 Drawing Sheets

(56) References Cited

OTHER PUBLICATIONS

Niu et al., "Multi-agent decision fusion for motor fault diagnosis", Mechanical Systems and Signal Processing 21 (2007) 1285-1299 (Year: 2007).*
Mirmoeini et al, "Reconfigurable Bayesian Networks for Hierarchical Multi-Stage Situation Assessment in Battlespace", 39th Asilomar Conference on Signals, Systems and Computers, 2005 (Year: 2005).*
International Search Report dated Oct. 24, 2014 in related application No. PCT/EP2014/002030.
Written Opinion dated Oct. 24, 2014 in related application No. PCT/EP2014/002030.
European Search Report and Opinion dated Jan. 7, 2014 in related application No. EP 13460053.5.
Yang et al.; *Application of Dempster-Shafer theory in fault diagnosis of induction motors using vibration and current signals*; Mechanical Systems and Signal Processing, London; vol. 20, No. 2; Feb. 1, 2006; pp. 403-420.
Yang et al.; *VIBEX: An expert system for vibration fault diagnosis of rotating machinery using decision tree and decision table*; Expert Systems with Applications; vol. 28, 2005; pp. 735-742.

* cited by examiner

METHOD FOR CONDITION MONITORING OF A DISTRIBUTED DRIVE-TRAIN

CROSS-REFERENCE TO RELATED APPLICATION

This is a § 371 application of International patent application number PCT/EP2014/002030 filed Jul. 22, 2014, which claims the benefit of European patent application No. 13460053.5 filed on Aug. 5, 2013, and which are incorporated herein by reference.

TECHNICAL FIELD

The subject of the invention is a method for condition monitoring of distributed drive-trains using Bayesian data fusion approach for measured data. Condition Monitoring techniques are often focused on the analysis of a specific piece of equipment, very often missing the whole picture of the system. For example, a misalignment in a load bearing may cause torque oscillations that propagate throughout the system. These oscillations may result in certain condition monitoring indicators to be activated erroneously, as the fault signature of the faulty load bearing may coincide with the signature predicted for a different type of fault in a different component. Without a method for performing a "distributed" analysis that considers all parts of the system, false alarms are highly likely and unnecessary maintenance actions may be taken by service personnel. Fusing Data from the various components of the drive-train allows such a distributed analysis to be conducted. Data fusion techniques have been used extensively in military applications, but recently these methods have started to find applications in industry, finding home in such applications as robotics, sensor networks, video and image processing, and distributed control systems, amongst others. Data fusion techniques can be used to evaluate the health condition drive-train components such as the motor or the gearbox. In these cases, indicators from different sensors mounted to the devices being analyzed are fused to obtain a more complete diagnosis.

BACKGROUND ART

Data Fusion applications for condition monitoring have been reported in academic literature, mainly in the field of electric motor diagnostics [1] and gearbox diagnostics [2]. In the first case, the diagnosis of an electric motor is conducted by fusing vibration and current signals, and in the case of the gearbox, it is carried out fusing vibration signals and debris analysis results. In neither case are the signals from the other components considered.

Similarly, Bayesian inference-based condition monitoring techniques have been developed previously. In Ref. [3] an expert system for vibration fault diagnosis is shown. The system makes use of a Bayesian algorithm to define probabilities that are included in a decision tree or in a decision table, and then, on the basis of observations, the expert system generates a diagnosis of the health of the system. It is important to note that only vibration signals are used in the construction of the decision tree or the decision table and that the method was used to diagnose only electric motors, not the entire drive-train.

Multi-sensor Data Fusion has been typically used in applications that make use of Neural Networks. In this case, the raw signals are fed to the neural network to train it. From patent description U.S. Pat. No. 7,539,549 there is known a system and a method in which a neural network is trained with multiple kinds of signals, and afterwards a Fuzzy Logic-based Expert System is used to diagnose a motor-pump arrangement. Due to the fact that such systems require large amount of data to be available in order to initially train the network, they are less than ideal. Furthermore, whilst neural networks are undoubtedly powerful, they represent black-boxes in that the underlying reasoning as to why a particular decision has been made is difficult to ascertain. By combining indicators (which in general are based on physical reasoning, e.g. using the kurtosis to identify the impulsive nature of a measured signal that is indicative of a localized gear tooth problem in a gearbox) with fault probabilities given by experts in the field, the approach given in this disclosure allows the reasoning for each and every decision to be rationalized fully.

SUMMARY OF THE INVENTION

A method for condition monitoring of distributed drive-train comprising measurement of physical signals obtained from sensors of the components being chosen from the drive-train which are delivered to the computer means for processing the measured data and performing data fusion processes, using a data from information database containing at least one information system, characterized in that it comprising two stages for data fusion processes according to the Bayesian rules and on a base of the second stage the assessment of the condition of the drive-train is performed by choosing the maximum value of the received data, which maximum value triggers an alarm for drive-train.

The first stage is consisting of determination of the local posterior probability of fault of the individual component c, $p^c(t_i, s^c(t_i))$, of the drive-train, using Bayesian Inference according to a formula:

$$p^c(t_i, s^c(t_i)) = \frac{1}{A} L^c(y^c(t_i) \mid s^c(t_i)) p^{c-}(t_i, s^c(t_i))$$

where:
$t_i$ is a time instant,
$s^c(t_i)$ is the component condition s at the time instant $t_i$,
c: 1, 2, 3, ..., C and C is the number of the components,
$p^{c-}(t_i, s^c(t_i))$ is the prior probability of fault for the individual component c,
$L^c(y^c(t_i)|s^c(t_i))$ is an indicator likelihood function ILF for the individual component c,
$y^c(t_i)$ is the vector of indicator values of the component c at the time instant $t_i$, is a normalizing constant, The second stage is consisting of determination of the global posterior probability of fault $p(t_i, S(t_i))$ of the drive-train, using Bayesian Inference according to:

$$p(t_i, S(t_i)) = \frac{1}{B} L(Y(t_i) \mid S(t_i)) p^{-}(t_i, S(t_i))$$

where:
$t_i$ is a time instant,
$S(t_i)$ is the global condition S of the drive-train at the time instant $t_i$,
$p^{-}(t_i, S(t_i))$ is the global prior probability of fault of the drive-train, $Y(t_i)$ is the vector of local posterior probabilities of fault for all the components in the drive-train, at the time instant $t_i$, $L(Y(t_i)|S(t_i))$ is the Global Likelihood Function GLF for the drive-train, this GLF is obtained by multiplying the different overall likelihood functions OLF of the different components $\Pi_{c=1}{}^C = L^c(Y^c(t_i)|S(t_i))$, where $Y^c(t_i)$ is equal to the local posterior probability of fault for the component c defined as $p^c(t_i, s^c(t_i))$, B is a normalizing constant.

The prior probability of fault for the individual component c, $p^{c-}(t_i, s^c(t_i))$ is calculated using the component last know condition and the component fault development model.

The global prior probability of fault of the drive-train, $p^-(t_i, S(t_i))$, is calculated using the global last known condition and a global development model.

All the information related with the operating conditions of the drive-train, components degradation models, expert knowledge rules, etc. is stored in different information systems of an information database. Such information systems, can be the Expert Knowledge System EKS, the Component Life Time Estimation System CLTES, and/or the Equipment Operating Condition Information System EOCIS.

The Global Likelihood Function GLF is calculated using at least two components from the drive-train.

The data used for the calculation of the Global Likelihood Function GLF is obtained from signals measured and processed for a motor and a gearbox or a load, or their combination.

A computer program for condition monitoring of distributed drive-trains, which is loadable into and executable in the computer processing device (4), characterized in that during program run it executes the method according to claims 1 through 6.

The integration of Bayesian Inference rules for local and global scopes of the system, allows for the detection of possible interactions between the different components, that might be unseen if a typical local (single component oriented approach) is used.

BRIEF DESCRIPTION OF THE DRAWINGS

The method in the described embodiment of the invention is presented in the drawings where.

BEST MODE FOR CARRYING OUT THE INVENTION

Figure 1:
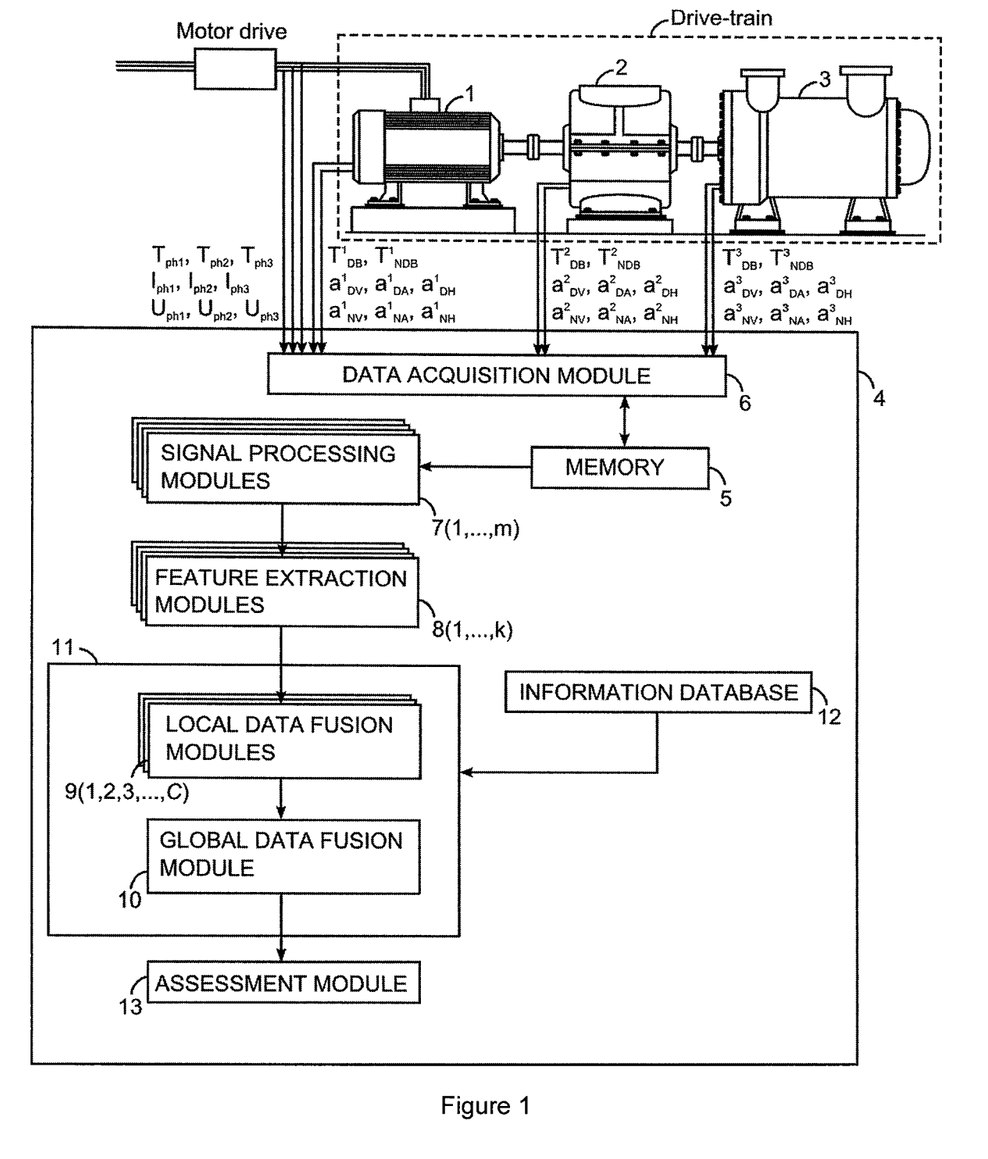
FIG. 1 shows the schematic view of the drive-train and means for realization of the method.

The method according to the invention is realized on the example drive-train system which is presented in FIG. 1. The system is presented for three current phases phase 1, phase 2, phase 3 and comprises an electric motor 1, and the driven equipment in the form of gearbox 2, and load 3. The load 3 can be a compressor or pump or fan. All components of the drive-train system have their own means of measuring information sensors, which are not presented in the drawing. The different signals from the different sensors of all of the components are gathered and processed in a computer device 4, having a memory module 5, a data acquisition module 6, a signal processing module 7, a data feature extraction module 8, a local data fusion module 9 and a global data fusion module 10 contained in a processor 11, to which an input of an information database 12 is connected. The signal processing module 7 has several functional modules 7.1, 7.2, . . . , 7.$m$ (where m is a natural number) adapted for processing different signals according to different methods and rules. Different processing techniques enclosed in separate modules can be used for different types of signals. For example it may comprise a module for time domain metrics, a module for spectral analysis, a module for envelope analysis (Hilbert Transform), a module for Cepstrum calculation and analysis, a module for synchronous signal average calculation, a module for time-frequency analysis etc. Processed signals obtained in the signal processing module 7 are sent to the feature extraction module 8, said module calculates fault indicators that help to assess the health of the drive-train components, said condition indicators are afterwards sent to the data fusion module 9. Said data fusion module considers each component of the drive-train as a subsystem, therefore the local data fusion module contains a number of modules 9.1, 9.2, . . . , 9.$m$ (where m is a natural number), one module for every component of the drive-train. The information database 12 contains at least one information system, for example Expert Knowledge System EKS, Component Life Time Estimation System CLTES, Equipment Operating Condition System EOCS. The outputs from the local data fusion module 9 and from the information database 12 are connected with the global data fusion module 10 whose output is connected with an assessment module 13.

Figure 2:
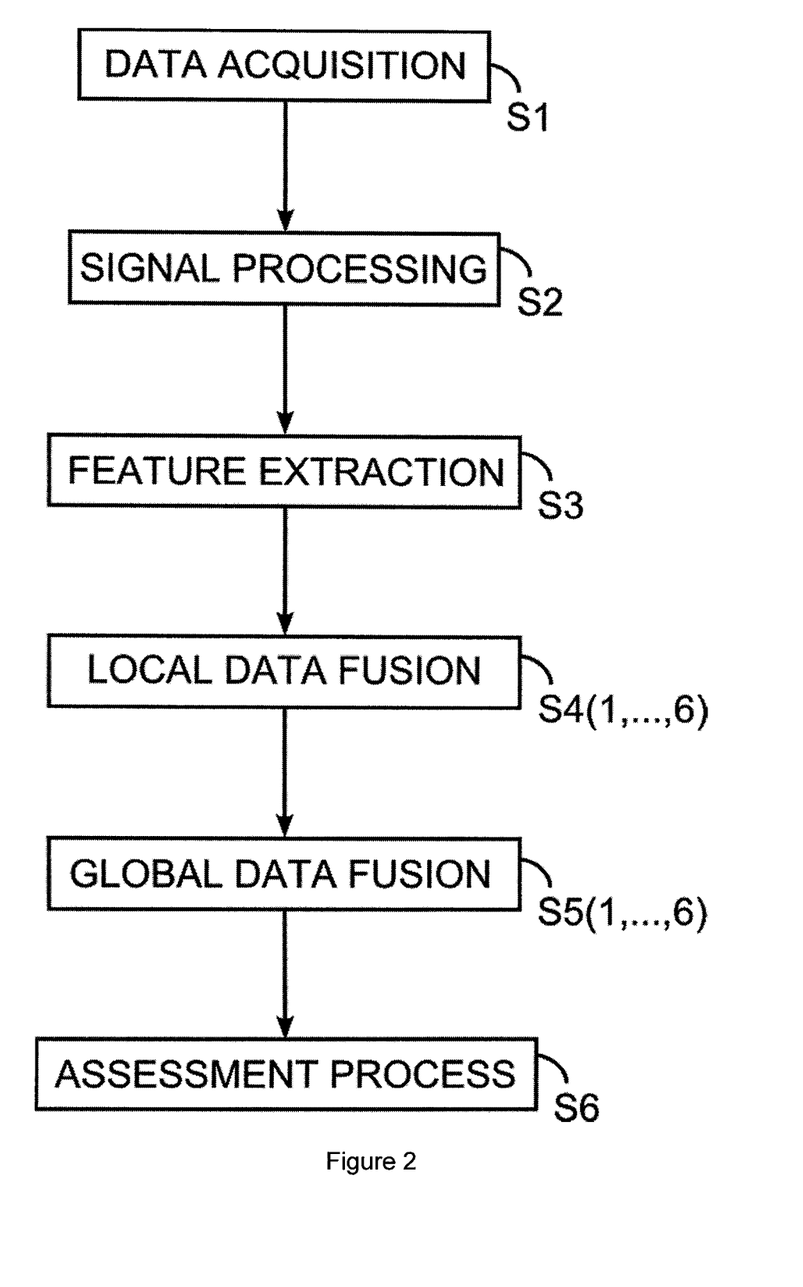
FIG. 2 shows a flow diagram of the different steps conducted to assess the condition of the drive-train.

The method according to the invention is realized in the exemplary embodiment of the drive-train, by applying the steps S1-S6 indicated in FIG. 2.

S1. Data Acquisition

The signals acquired from the drive-train illustrated in FIG. 1 are the following:

Signals from the electric motor 1: currents $I_{ph1}$, $I_{ph2}$, $I_{ph3}$ and voltages $U_{ph1}$, $U_{ph2}$, $U_{ph3}$, electric motor windings and bearing temperatures $T_{ph1}$, $T_{ph2}$, $T_{ph3}$, $T_{DB}{}^1$, $T_{NDB}{}^1$, electric motor bearing vibrations $a_{DV}{}^1$, $a_{DA}{}^1$, $a_{DH}{}^1$, $a_{NV}{}^1$, $a_{NA}{}^1$, $a_{NH}{}^1$ where ph1, ph2, ph3—denote the electric motor phases and its respective windings, DB—means electric motor drive side bearings, NDB—means electric motor non-drive side bearings, DV—means drive side vertical direction, DA—means drive side axial direction, DH—means drive side horizontal direction, NV—means non-drive side vertical direction, NA—means non-drive side axial direction and NH—means non-drive side horizontal direction.

Signals from the gearbox 2: gearbox bearing temperatures $T_{DB}{}^2$, $T_{NDB}{}^2$, and gearbox bearing vibrations $a_{DV}{}^2$, $a_{DA}{}^2$, $a_{DH}{}^2$, $a_{NV}{}^2$, $a_{NA}{}^2$, $a_{NH}{}^2$, where DB—means gearbox drive side bearings, NDB—means gearbox non-drive side bearings, DV—means drive side vertical direction, DA—means drive side axial direction, DH—means drive side horizontal direction, NV—means non-drive side vertical direction, NA—means non-drive side axial direction and NH—means non-drive side horizontal direction.

Signals from the load 3: load bearing temperature (from drive side and non-drive side) $T_{DB}^3$, $T_{NDB}^3$, and load bearing vibrations $a_{DV}^3$, $a_{DA}^3$, $a_{DH}^3$, $a_{NV}^3$, $a_{NA}^3$, $a_{NH}^3$, where DB—means load drive side bearings, NDB—means load non-drive side bearings, DV—means drive side vertical direction, DA—means drive side axial direction, DH—means drive side horizontal direction, NV—means non-drive side vertical direction, NA—means non-drive side axial direction and NH—means non-drive side horizontal direction.

All signals are gathered in the memory module 5 of the computer device 4.

S2. Signal Processing

After the data acquisition, specific processing techniques are applied in the signal processing module 7(1, . . . , m) according to the type of the signal and its source. Fourier transform 7.1, Hilbert Transform 7.2, Spectral Kurtosis 7.3, Time Synchronous Averaging 7.4, Cepstrum 7.5, amongst others, are examples of the m types of techniques that may be applied. Evidently, depending on the type of signal, all of the techniques or just a selection of the techniques may be used to analyze said signal. Some techniques apply for the analysis of signals from the electric motor 1, some others for the analysis the signals from the gearbox 2, load 3, and so on. When the signals are processed, the resulting signals are sent to the feature extraction module 8.

S3. Feature Extraction

In the feature extraction process, the fault indicators $y_1$, $y_2$, . . . , $y_K$ (where K is a natural number) of the different drive-train individual components are calculated and gathered in feature extractor module 8. Said indicators are representative of the different type of faults ($z_1$, $z_2$, . . . , $z_N$)—(where N is a natural number) that could be present in said drive-train component. An example of a list of fault indicators $y_1$, $y_2$, . . . , $y_K$ and the associated fault scenarios for each element of the drive-train is given in Table 1. The superscripts shown in the Table 1 for the indicator names ($y^1$, $y^2$, $y^3$), denote the associated drive-train component 1: Electric motor, 2: Gearbox and 3: Load.

TABLE 1

| Drive-train Component | Indicator Name | Indicated fault type |
|---|---|---|
| Electric Motor 1 | $y^1_1$: Electric motor Broken Bar Indicator | $z^1_1$: Rotor broken bar. |
| | $y^1_2$: Electric motor Eccentricity Indicator | $z^1_2$: Rotor static or dynamic eccentricity. |
| | $y^1_3$: Electric motor Misalignment Indicator | $z^1_3$: Electric motor shaft misalignment. |
| | $y^1_4$: Electric motor Unbalance Indicator | $z^1_4$: Electric motor shaft unbalance. |
| | $y^1_5$: Electric motor Looseness Indicator | $z^1_5$: Structural or rotating looseness. |
| | $y^1_6$: Electric motor bearing vibrations Crest Factor value | $z^1_6$: Motor bearings faults. |
| | $y^1_7$: Electric motor bearing vibrations Kurtosis value | |
| | $y^1_8$: Electric motor bearing vibrations RMS value | |
| | $y^1_9$: Electric motor bearing vibrations Peak to Peak value | |
| | $y^1_{10}$: Electric motor Rotor Windings temperature values | $z^1_7$: Winding problems, or $z^1_1$: Rotor broken bar. |
| | $y^1_{11}$: Electric motor bearings temperature values | $z^1_6$: Bearing problems, $z^1_3$: Shaft Misalignment, $z^1_4$: Shaft unbalance. |
| | $y^1_{12}$: Gearbox shafts problems Indicator (as seen from the electric motor) | $z^1_8$: Gearbox shaft related problems. |
| | $y^1_{13}$: Gearbox gears problems Indicator (as seen from the electric motor) | $z^1_9$: Gearbox gears related problems. |
| | $y^1_{14}$: Gearbox teeth problems Indicator(as seen from the electric motor) | $z^1_{10}$: Gearbox tooth problems. |
| Gearbox 2 | $y^2_1$: Electric motor rotor bar pass frequency peak indicator (as seen from the gearbox) | $z^2_1$: Electric motor rotor bar problems. |
| | $y^2_2$: Electric motor supply frequency peak indicator (as seen from the gearbox) | $z^2_2$: Electric motor rotor static eccentricity. |
| | $y^2_3$: Gearbox shaft looseness indicator | $z^2_3$: Gearbox shaft looseness. |
| | $y^2_4$: Gearbox shaft misalignment indicator | $z^2_4$: Gearbox shaft misalignment. |
| | $y^2_5$: Gearbox shaft unbalance indicator | $z^2_5$: Gearbox shaft unbalance. |
| | $y^2_6$: Gearbox gear eccentricity indicator | $z^2_6$: Gearbox gear eccentricity. |
| | $y^2_7$: Gearbox gear misalignment indicator | $z^2_7$: Gearbox gear misalignment. |
| | $y^2_8$: Gearbox tooth problem indicator | $z^2_8$: Broken or cracked gear tooth. |
| | $y^2_9$: Gearbox bearing vibration Crest Factor value | $z^2_9$: Gearbox bearing problems. |

TABLE 1-continued

| Drive-train Component | Indicator Name | Indicated fault type |
|---|---|---|
| | $y^2_{10}$: Gearbox bearing vibration Kurtosis value | |
| | $y^2_{11}$: Gearbox bearing vibration RMS value | |
| | $y^2_{12}$: Gearbox bearing vibration Peak to Peak value | |
| | $y^2_{13}$: Gearbox bearing temperature values | $z^2_9$: Gearbox bearing problems, $z^2_4$: gearbox shaft Misalignment, $z^{G2}_5$: gearbox shaft unbalance. |
| | $y^2_{14}$: Compressor blade pass frequency peak (as seen from the gearbox) | $z^2_{10}$: Cracked or deformed compressor blades. |
| | $y^2_{15}$: Compressor Flow Turbulence indicator (as seen from the gearbox) | $z^2_{11}$: Excessive Flow turbulence in the compressor. |
| Load (e.g. compressor) 3 | $y^3_1$: Gearbox shafts problems Indicator (as seen from the load) | $z^3_1$: Gearbox shaft misalignment, unbalance or looseness. |
| | $y^3_2$: Gearbox gears problems Indicator (as seen from the load) | $z^3_2$: Gearbox gears misalignment or wear. |
| | $y^3_3$: Gearbox teeth problems Indicator(as seen from the load) | $z^3_3$: Gearbox tooth broken or cracked. |
| | $y^3_4$: Compressor shaft misalignment indicator | $z^3_4$: Compressor shaft misalignment |
| | $y^3_5$: Compressor shaft unbalance indicator | $z^3_5$: Compressor shaft unbalance |
| | $y^3_6$: Compressor shaft looseness indicator | $z^3_6$: Compressor shaft looseness |
| | $y^3_7$: Compressor flow turbulence indicator | $z^3_7$: Compressor excessive flow turbulence |
| | $y^3_8$: Compressor blade problems indicator | $z^3_8$: Cracked or deformed compressor blades. |
| | $y^3_9$: Compressor fouling problems indicator | $z^3_9$: Fouling problems present in the compressor |
| | $y^3_{10}$: Compressor bearing vibration Crest Factor value | $z^3_{10}$: Compressor bearings problems. |
| | $y^3_{11}$: Compressor bearing vibration Kurtosis value | |
| | $y^3_{12}$: Compressor bearing vibration RMS value | |
| | $y^3_{13}$: Compressor bearing vibration Peak to Peak value | |
| | $y^3_{14}$: Compressor bearing temperature values | $z^3_{10}$: Compressor bearing problems, $z^2_4$: Compressor shaft Misalignment, $z^2_5$: Compressor shaft unbalance. |

Detailed descriptions of how each $y_1, y_2, \ldots, y_K$ indicator value is calculated is out of the scope of this disclosure, therefore no detailed explanation about these procedures will be provided. Those who are skilled in the state of the art will recognize that many such indicators exist, all of which may be utilized in the realization of this invention.

The set of fault indicators values associated with each drive-train component "c" $[y_1^c \ y_2^c \ \ldots \ y_K^c]$, (where K is a natural number) forms an indicators vector $y^c$ of said drive-train component (where c: 1, 2, 3 ..., C, and C is the total number of components in the drive-train being analyzed). For the drive-train illustrated in FIG. 1, three indicator vectors will be available after the feature extraction:

$$y^1 = [y_1^1 \ y_2^1 \ \ldots \ y_{14}^1]$$

$$y^2 = [y_1^2 \ y_2^2 \ \ldots \ y_{15}^2]$$

$$y^3 = [y_1^3 \ y_2^3 \ \ldots \ y_{14}^3] \quad (1)$$

Where the vector $y^1$ is associated with the electric motor 1, the vector $y^2$ is associated with the gearbox 2 and the vector $y^3$ is associated with the load 3.

Once all of the K fault indicator values of each $y^c$ vector are calculated, their values are sent to the local data fusion module 9. There will be a number of local data fusion modules equal to the number of c components in the drive-train. For the described embodiment there are 3 components. The electric motor 1, the gearbox 2, and the load 3, thus, there are 3 local data fusion modules 9.1, 9.2 and 9.3 respectively, what is presented in FIG. 3.

S4. Local Data Fusion Process

Figure 3:
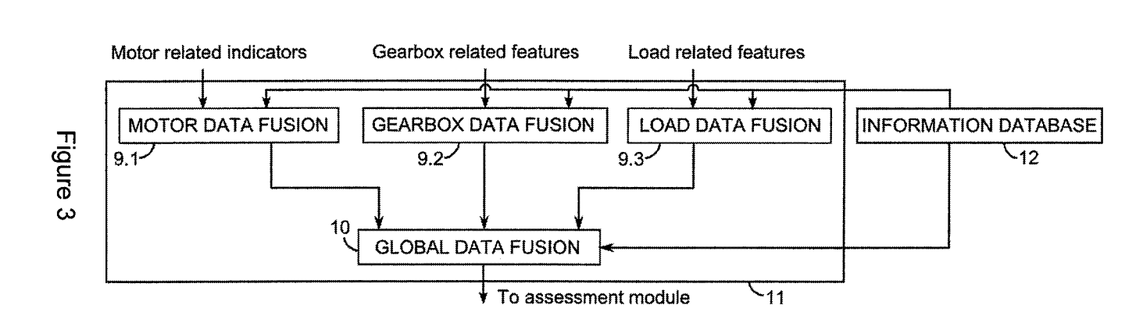
FIG. 3 shows means for realizing the data fusion process.

This step is realized in the processor 11, where the different data fusion modules are located. There is a local data fusion module for each of the drive-train components (FIG. 3).

Figure 4:
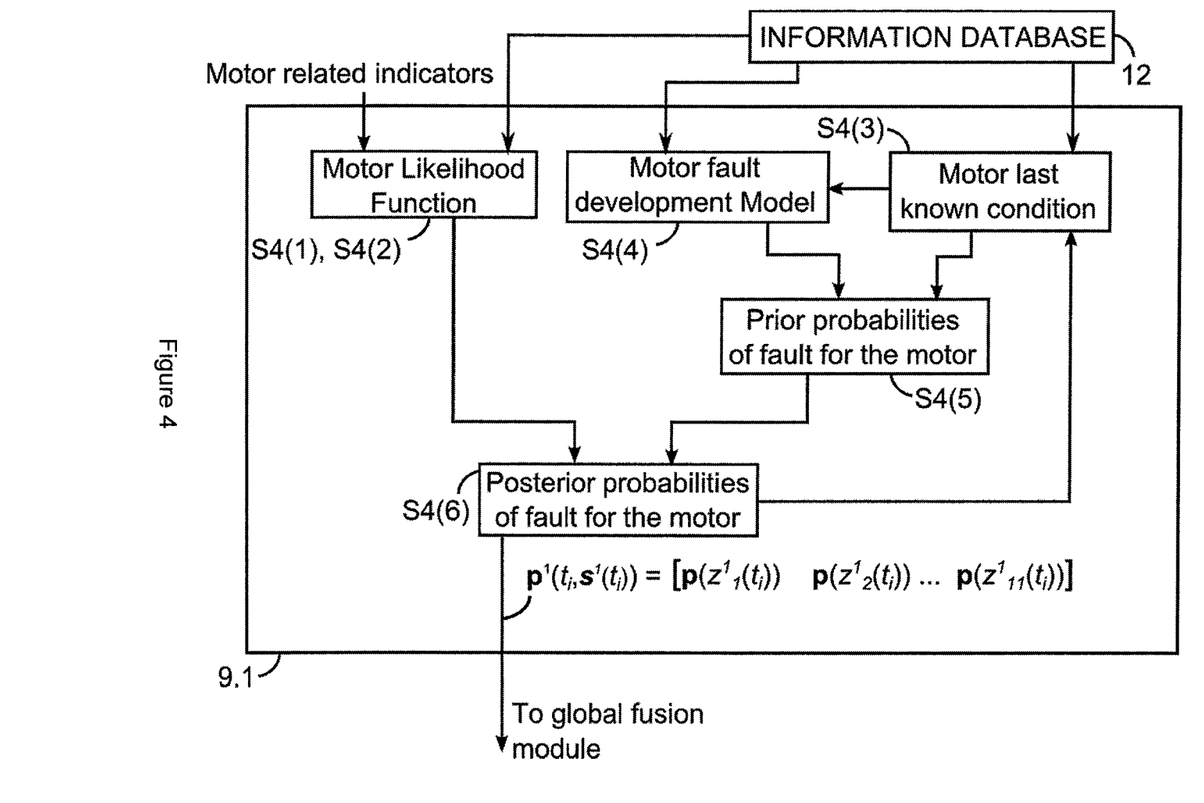
FIG. 4 shows means for realizing the local data fusion process for the electric motor 1 given in FIG. 1.

The process carried out inside each of the local data fusion modules is the same, the only difference is the input given to each of the modules. The local data fusion process is presented in FIG. 4 for the example case of the electric motor 1 and comprises the following six stages S4(1)-S4(6):

S4(1)—determination of the probability that a fault is present given the calculated Indicator values, or in other words, the determination of the Indicator Likelihood Functions.

The determination of the values of the Indicator Likelihood Functions ILFs are calculated from the following formula:

$$L_k^c(y_k^c(t_i)|s^c(t_i)) \quad (2)$$

where:

c: 1, 2, 3, ..., C and C is the total number of components in the drive-train being analyzed, $s^c$, represents the condition s of the component c, where $s^c$ can take discrete states, i.e. $s^c \in \{z_1^c \; z_2^c \; \ldots \; z_N^c\}$, corresponding to the different types of fault of the component c, $y_k^c(t_i)$ represents the value of the indicator k of the component c at the time instant $t_i$.

Each fault indicator has an associated likelihood function, therefore for each c component of the drive-train there will be a set of K Indicator likelihood functions (ILFs).

Figure 5:
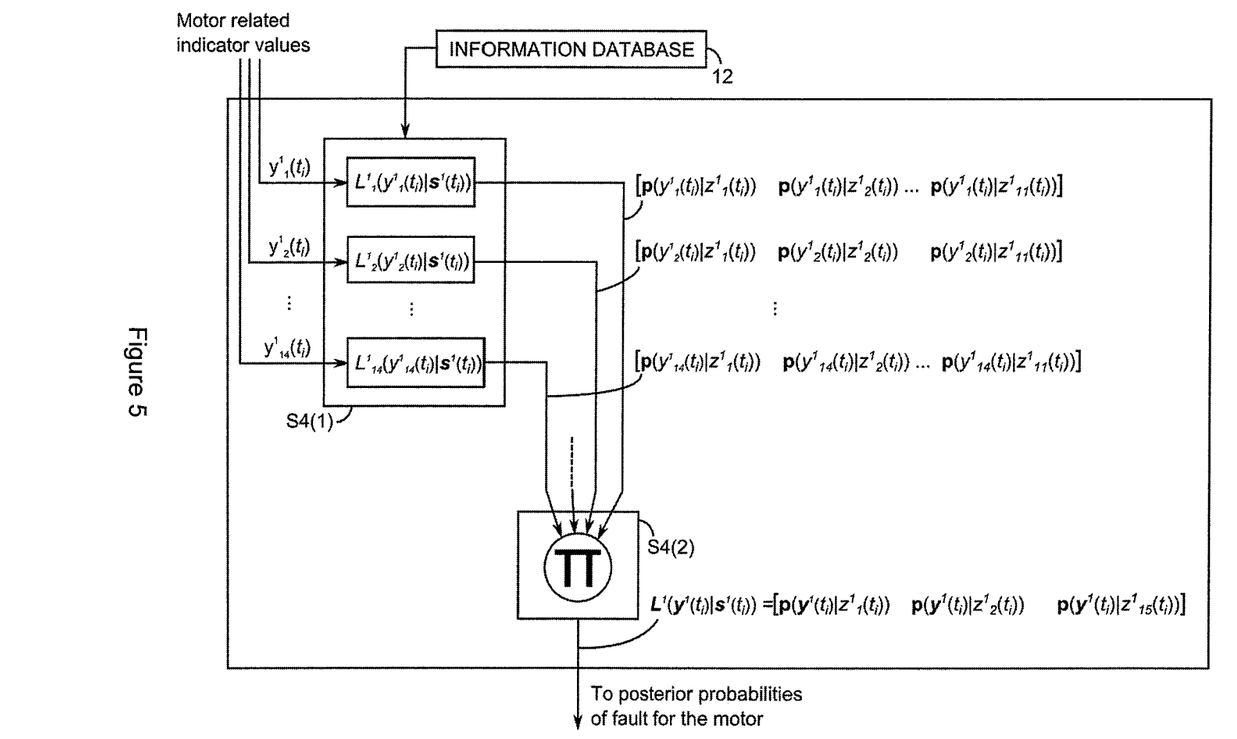
FIG. 5 shows means for conducting global data fusion for electric motor 1 given in FIG. 1.

Consider that after the feature extraction process, the value of the currently evaluated indicator $y_k^c$ equals $\alpha_k$ ($y_k^c = \alpha_k$). The Indicator Likelihood Function (ILF) associated with the indicator $y_k^c$ will receive the value $\alpha_k$ and will generate a set of probabilities corresponding to different types of potential faults associated with said indicator value, what is presented in FIG. 5 for motor 1. The output from the ILF from equation (2) may be given as:

$$[p(y_k^c(t_i)|z_1^c(t_i)) \; p(y_k^c(t_i)|z_2^c(t_i)) \; p(y_k^c(t_i)|z_3^c(t_i)) \ldots p(y_k^c(t_i)|z_{N+1}^c(t_i))] \quad (3)$$

Where each value $p(y_k^c(t_i)|z_1^c(t_i))$, $p(y_k^c(t_i)|z_2^c(t_i))$, ..., $p(y_k^c(t_i)|z_N^c(t_i))$, represents the probability that the indicator $y_k^c$ will have a value $\alpha_k$ when the fault $z_n$ is present in the component c, at the time instant $t_i$. The last probability value $p(y_k^c(t_i)|z_{N+1}^c(t_i))$ represents the probability that the indicator $y_k^c$ will have a value $\alpha_k$ when the component is healthy.

The different $p(y_k^c(t_i)|z_1^c(t_i))$, $p(y_k^c(t_i)|z_2^c(t_i))$, ..., $p(y_k^c(t_i)|z_{N+1}^c(t_i))$ probability values depend on the calculated value $\alpha$ of the indicator $y_k^c$:

$$p(y_k^c(t_i)|z_n^c(t_i)) = f_k(y_k^c) \quad (4)$$

Therefore, for each indicator likelihood function ILF, there will be a set of "K" functions $f_k$ that depend on each of the $y_1, y_2, \ldots, y_K$ fault indicators. Said functions are defined by using the information systems present in the information database 12. Said information database 12 contains a set of logical rules associated with (but not limited to) previous knowledge about the machine operating conditions, machine location environmental conditions, machine service factor, machine maintenance operations and machine health degradation models.

As an example, consider that after the feature extraction process S3, the fault indicators of the electric motor 1 have the following values $y_1^1 = \alpha_1$, $y_2^1 = \alpha_2$, ..., $y_{14}^1 = \alpha_{14}$.

Then, the probability values obtained from each ILF of the electric motor could be (these probability values are arbitrarily selected for the purpose of the description):

$$L_1^1(y_1^1(t_i) \,|\, s^1(t_i)) = [0.47 \; 0.18 \; 0.09 \; 0.07 \; 0.06 \; 0.06 \; 0.03 \; 0.03 \; 0.005 \; 0.004 \; 0.001] \quad (5)$$

$$L_2^1(y_2^1(t_i) \,|\, s^1(t_i)) = [0.08 \; 0.13 \; 0.06 \; 0.07 \; 0.07 \; 0.09 \; 0.04 \; 0.16 \; 0.17 \; 0.044 \; 0.07]$$

$$\vdots$$

$$L_{14}^1(y_{14}^1(t_i) \,|\, s^1(t_i)) = [0.02 \; 0.02 \; 0.02 \; 0.02 \; 0.02 \; 0.02 \; 0.02 \; 0.02 \; 0.02 \; 0.02 \; 0.8]$$

Considering the first ILF given in equation (5) $L_1^1(y_1^1(t_i)|s^1(t_i))$, there is a 47% probability that $y_1^1 = \alpha_1$ when the fault $z_1^1$ (Rotor broken bar) is present, a 18% probability that $y_1^1 = \alpha_1$ when the fault $z_2^1$ (Rotor eccentricity) is present, a 9% probability that $y_1^1 = \alpha_1$ when the fault $z_3^1$ (electric motor shaft misalignment) is present, a 7% probability that $y_1^1 = \alpha_1$ when the fault $z_4^1$ (electric motor shaft Unbalance) is present, a 6% probability that $y_1^1 = \alpha_1$ when the fault $z_5^1$ (Looseness) is present, a 6% probability that $y_1^1 = \alpha_1$ when the fault $z_6^1$ (electric motor bearings faults) is present, a 3% probability that $y_1^1 = \alpha_1$ when the fault $z_7^1$ (Winding problems) is present, a 3% probability that $y_1^1 = \alpha_1$ when the fault $z_8^1$ (Gearbox shaft related problems) is present, a 0.5% that $y_1^1 = \alpha_1$ when the fault $z_9^1$ (Gearbox gears related problems) is present, a 0.4% that $y_1^1 = \alpha_1$ when the fault $z_{10}^1$ (Gear tooth problems) is present and a 0.1% probability that $y_1^1 = \alpha_1$ when the system is healthy.

For the gearbox 2, given the fault indicator values $y_1^2 = \beta_1$, $y_2^2 = \beta_2$, ..., $y_{14}^2 = \beta_{14}$, the probability values obtained from each gearbox ILF could be:

$$L_1^2(y_1^2(t_i) \,|\, s^2(t_i)) = [0.018 \; 0.11 \; 012 \; 0.02 \; 0.12 \; 0.04 \; 0.07 \; 0.16 \; 0.1 \; 0.1 \; 0.02 \; 0.08] \quad (6)$$

$$L_2^2(y_2^2(t_i) \,|\, s^2(t_i)) = [0.11 \; 0.009 \; 0.05 \; 0.09 \; 0.06 \; 0.11 \; 0.11 \; 0.03 \; 0.1 \; 0.1 \; 0.14 \; 0.08]$$

$$\vdots$$

$$L_{15}^2(y_{15}^2(t_i) \,|\, s^2(t_i)) = [0.1 \; 0.09 \; 0.04 \; 0.1 \; 0.04 \; 0.12 \; 0.09 \; 0.15 \; 0.13 \; 0.02 \; 0.08 \; 0.04]$$

For the load 3, given the fault indicator values $y_1{}^3=\theta_1$, $y_2{}^3=\theta_2,\ldots,y_{14}{}^3=\theta_{14}$, the probability values obtained from each load ILF could be:

$$L_1^3(y_1^3(t_i) \mid s^3(t_i)) = [0.4\ \ 0.18\ \ 0.09\ \ 0.07\ \ 0.06\ \ 0.06\ \ 0.03\ \ 0.03\ \ 0.006\ \ 0.004\ \ 0.07] \quad (7)$$

$$L_2^3(y_2^3(t_i) \mid s^3(t_i)) = [0.1\ \ 0.5\ \ 0.12\ \ 0.07\ \ 0.06\ \ 0.06\ \ 0.03\ \ 0.03\ \ 0.006\ \ 0.004\ \ 0.08]$$

$$\vdots$$

$$L_{14}^3(y_{14}^3(t_i) \mid s^3(t_i)) = [0.004\ \ 0.006\ \ 0.03\ \ 0.03\ \ 0.06\ \ 0.03\ \ 0.03\ \ 0.08\ \ 0.1\ \ 0.4\ \ 0.07]$$

S4(2)—determination of the probability that a fault is present in the component c given the whole set of ILFs associated with said component, indicated as component likelihood functions CLF.

The determination of the component likelihood functions CLFs is conducted by using the indicator likelihood functions ILF and the following formula:

$$L^c(y^c(t_i) \mid s^c(t_i)) = \prod_{k=1}^{K} L_k^c(y_k^c(t_i) \mid s^c(t_i)) \quad (8)$$

where:

c: 1, 2, 3, ..., C and C is the total number of components in the drive-train being analyzed, $s^c$, represents the condition s of the component c, where $s^c$ can take discrete states, i.e. $s^c \in \{z_1^c\ z_2^c\ \ldots\ z_N^c\}$, corresponding to the different types of fault of the component c, k: 1, 2, 3, ..., K, and K is the total number of indicators considered for each individual component, $t_i$ is the time instant i.

Therefore, for the drive-train in FIG. 1, three different CLFs will be obtained, each corresponding to different component.

$$L^1(y^1(t_i) \mid s^1(t_i)) = \prod_{k=1}^{14} L_k^1(y_k^1(t_i) \mid s^1(t_i)) \quad (9)$$

$$L^2(y^2(t_i) \mid s^2(t_i)) = \prod_{k=1}^{15} L_k^2(y_k^2(t_i) \mid s^2(t_i))$$

$$L^3(y^3(t_i) \mid s^3(t_i)) = \prod_{k=1}^{14} L_k^3(y_k^3(t_i) \mid s^3(t_i))$$

S4(3)—obtaining the last known condition $p^c(t_{i-1},s^c(t_{i-1}))$ of the individual component under analysis.

The last known condition $p^c(t_{i-1},s^c(t_{i-1}))$ is expressed by the following formula:

$$p^c(t_{i-1},s^c(t_{i-1}))=[p(z_1^c(t_{i-1})),\ p(z_2^c(t_{i-1}))\ \ldots\ p(z_{N+1}^c(t_{i-1}))] \quad (10)$$

and it represents the posterior probability of fault for the component c, calculated for the immediate previous time instant $t_{i-1}$.

For the case when the current time instant is $t_0=0$ for i=1, the last known condition is considered to be the initial probabilities of fault for the component C. Said initial probability of fault can be defined through the use of the information database 12, and its information systems.

S4(4)—determination of the component fault development model $q^c(s^c(t_i)|s^c(t_{i-1}))$.

The component fault development model $q^c(s^c(t_i)|s^c(t_{i-1}))$ defines how the probabilities of a fault change over time, according to previously assessed conditions. Said model is determined through the use of the last known condition of a component and various information systems contained within the information database 12. This component fault development model for a component c is expressed in the following formula:

$$q^c(s^c(t_i)|s^c(t_{i-1}))=[p(z_1^c(t_i)|s^c(t_{i-1})),\ p(z_2^c(t_i)|s^c(t_{i-1}))\ \ldots\ p(z_{N+1}^c(t_i)|s^c(t_{i-1}))] \quad (11)$$

where c: 1, 2, 3, ..., C and C is the total number of components in the drive-train being analyzed, $z_1^c z_2^c,\ldots,z_N^c$ are the discrete states that $s^c$ can take, and represent the possible different faults of the component c and $z_{N+1}^c$ is an additional state that $s^c$ can take and represents the healthy condition of the component c.

The component fault development model represents the expected probabilities of faults for the component c at a time instant $t_i$, based on the probabilities of fault for the component c at a time instant $t_{i-1}$.

Said component fault development model, is defined through the use of the last known condition of the component and the information systems present in the information database 12.

S4(5)—calculation of the prior probabilities of fault for the component c, $p^{c-}(t_i,s^c(t_i))$ The calculation of the prior probabilities of fault for the component c is performed by using the component last known condition $p^c(t_{i-1},s^c(t_{i-1}))$ and the component fault development model $q^c(s^c(t_i)|s^c(t_{i-1}))$ according to the formula:

$$p^{c-}(t_i,s^c(t_i))=\int q^c(s^c(t_{i-1})|s^c(t_{i-1}))p^c(t_{i-1},s^c(t_{i-1}))ds_{i-1} \quad (12)$$

where:

c: 1, 2, 3, ... C and C is the total number of components in the drive-train being analyzed, $ds_{i-1}$ is used to indicate integration with respect to the condition state.

The condition states are discrete, therefore equation (12) can be also expressed as:

$$p^{c-}(t_i,s^c(t_i))=q^c(s^c(t_i)|s^c(t_{i-1}))\oplus p^c(t_{i-1},s^c(t_{i-1})) \quad (13)$$

Where $\oplus$, represents the element-wise product, $$q^c(s^c(t_i)|s^c(t_{i-1}))=[p(z_1^c(t_i)|s^c(t_{i-1})),\ p(z_2^c(t_i)|s^c(t_{i-1}))\ \ldots\ p(z_{K+1}^c(t_i)|s^c(t_{i-1}))],\text{ and}$$

$$p^c(t_{i-1},s^c(t_{i-1}))=[p(z_1^c(t_{i-1})),\ p(z_2^c(t_{i-1}))\ \ldots\ p(z_{K+1}^c(t_{i-1}))].$$

S4(6)—obtaining the posterior probability of fault for the component c, $p^c(t_i,\ s^c(t_i))$, The obtaining of the posterior probability of fault for the component c, $p^c(t_i,s^c(t_i))$ is performed by the fusing the data of the prior probabilities of fault for the component c, $p^{c-}(t_i,s^c(t_i))$, with the component likelihood function CLF, $L^c(y^c(t_i)|s^c(t_i))$. Such data fusion process is conducted by applying the Bayes Inference rules, through the use of:

$$p^c(t_i, s^c(t_i)) = \frac{1}{A} L^c(y^c(t_i) \mid s^c(t_i)) p^{c-}(t_i, s^c(t_i)) \quad (14)$$

where the result of $p^c(t_i,s^c(t_i))$ is a distribution of non-normalized probabilities:

$$[p(z_1^c(t_i)), p(z_2^c(t_i)) \ldots p(z_{K+1}^c(t_i))] \quad (15)$$

And A in equation (14) is the normalizing constant usually calculated as:

$$A = \sum_{k=1}^{K+1} p(z_k^c(t_i)) \quad (16)$$

This posterior probabilities of fault for the component c would be considered as the last known component condition in the case the data fusion is conducted in a future time instant $t_{i+1}$.

S5. Global Data Fusion Process

For the local data fusion, each drive-train component c has its own list of possible faults (as per example Table 1). For the Global data fusion process all the possible faults are considered at the same time. The Table 2 lists the whole set of faults taken into account for the global data fusion process.

TABLE 2

Figure 6:
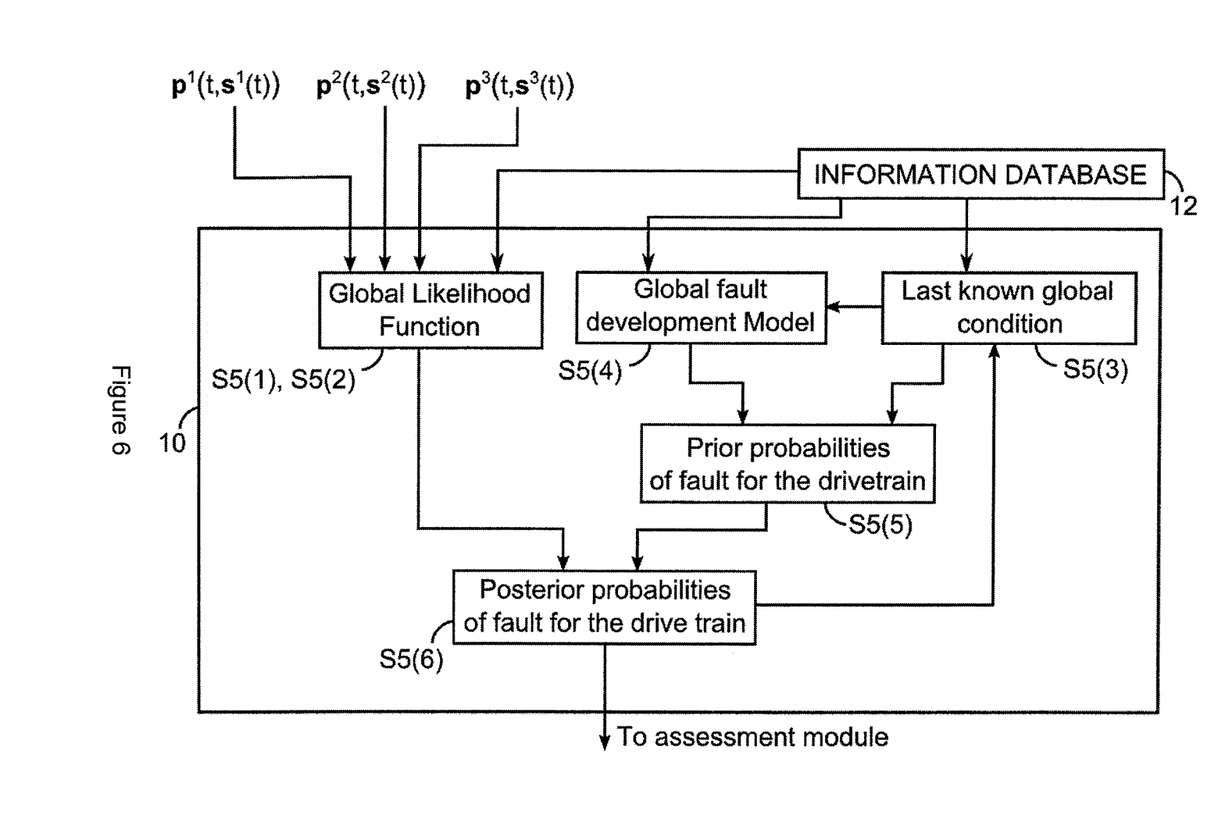
FIG. 6 shows means for realizing the global data fusion process for the drive-train given in FIG. 1.

List of fault considered for the global data fusion $Z_1$: Rotor bar problems
$Z_2$: Excessive air gap eccentricity in the electric motor
$Z_3$: Electric motor shaft misalignment
$Z_4$: Electric motor shaft unbalance
$Z_5$: Excessive structural or rotating looseness
$Z_6$: Electric motor bearings faults
$Z_7$: Electric motor winding problems
$Z_8$: Gearbox excessive structural or rotating looseness
$Z_9$: Gearbox shaft misalignment
$Z_{10}$: Gearbox shaft unbalance
$Z_{11}$: Gearbox gear eccentricity
$Z_{12}$: Gearbox gear misalignment
$Z_{13}$: Gearbox tooth problems
$Z_{14}$: Gearbox bearings problems
$Z_{15}$: Compressor shaft misalignment
$Z_{16}$: Compressor shaft unbalance
$Z_{17}$: Compressor shaft looseness
$Z_{18}$: Compressor excessive flow turbulence
$Z_{19}$: Compressor blades cracked or deformed
$Z_{20}$: Compressor fouling problems
$Z_{21}$: Compressor bearing problems The global data fusion process takes place in the global data fusion module 12, what is presented in FIG. 6. To carry out the global data fusion process, the probabilities of fault for all the components, need to be obtained and sent to the global data fusion module (10).

The process is comprised of the following six stages S5(1)-S5(6):

S5(1)—determination of the probability that a fault is present in the drive-train given the posterior probabilities of fault for the components, or in other words determination of the Overall Likelihood Functions.

The overall likelihood functions OLF are expressed by the following formula:

$$L^c(Y^c(t_i)|s(t_i)) = [P(Y^c(t_i)|Z_1(t_i)) \, P(Y^c(t_i)|Z_2(t_i)) \ldots P(Y^c(t_i)|Z_R(t_i))] \quad (17)$$

where:
c: 1, 2, 3, . . . C and C is the total number of components in the drive-train being analyzed,
$Y^c(t_i)$ represents the posterior probabilities of fault for the component c, at the time instant $t_i$.
R represents the total number of possible faults in the drive-train,
S represents the global drive-train condition, where S can take discrete states, i.e. $S \in \{Z_1 \, Z_2 \ldots Z_R\}$, corresponding to the different types of fault of the drive-train, listed in table 2,
$t_i$ represents the time instant i.
For the purpose of the example presented on FIG. 1, R=21, as can be seen in Table 2.

As shown in equation (17) the overall likelihood functions OLF takes as input the component posterior probabilities $p^c(t_i,s^c(t_i))$ and returns a probability distribution $[P(Y^c(t_i)|Z_1(t_i)) \, P(Y^c(t_i)|Z_2(t_i)) \ldots P(Y^c(t_i)|Z_{R+1}(t_i))]$.

The resulting probability distribution $[P(Y^c(t_i)|Z_1(t_i)) \, P(Y^c(t_i)|Z_2(t_i)) \ldots P(Y^c(t_i)|Z_{R+1}(t_i))]$ represents the probability that the component c will have a posterior probability of fault $p^c(t_i,s^c(t_i))$ when a fault $Z_r(t_i)$ is present, r being the number of the fault from the list considered for the global data fusion as can be seen in Table 2 (where r: 1, 2, 3, . . . , R). The last element of the probability distribution, $P(Y^c(t_i)|Z_{R+1}(t_i))$, represents the probability that the component c will have a posterior probability of fault $p^c(t_i,s^c(t_i))$ when the system is healthy.

Figure 7:
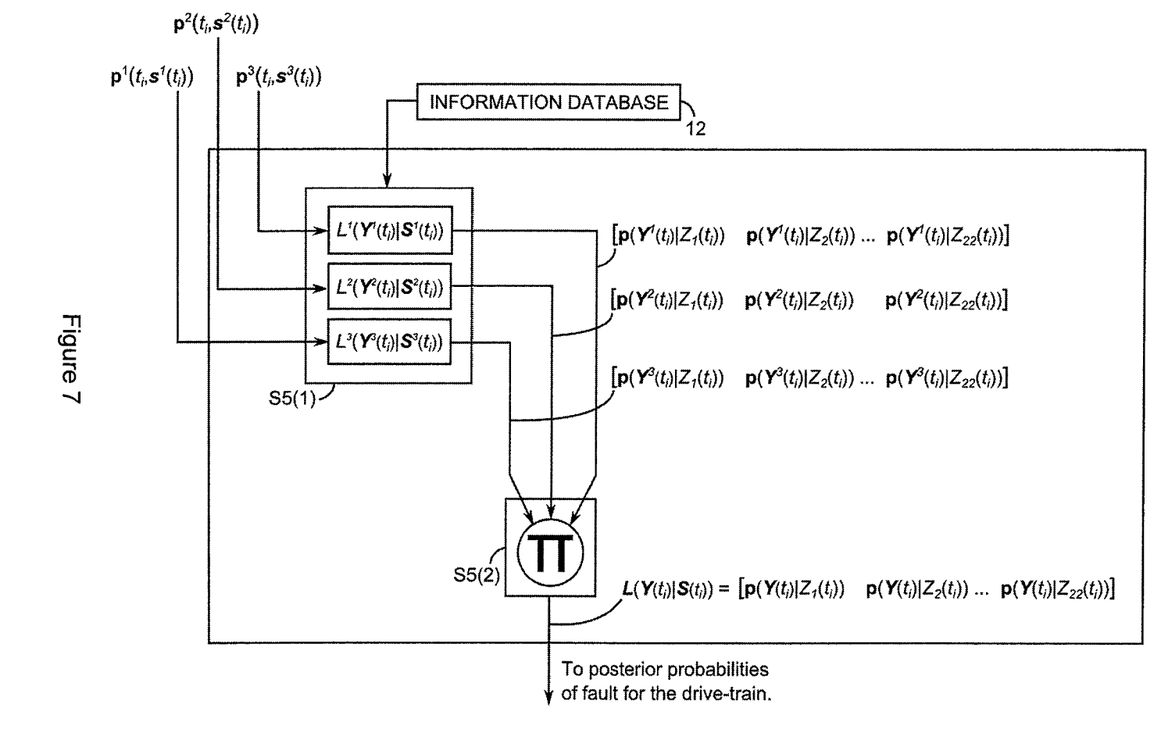
FIG. 7 shows means for conducting global data fusion for drive-train given in FIG. 1.

For the example drive-train presented on FIG. 1, there will be three OLFs, one associated with the electric motor 1, one associated with the gearbox 2 and one associated with the load 3, what is presented in FIG. 7. By using the information systems present in the information database 12, the different OLFs can be defined.

S5(2)—determination of the probability that a fault is present in the drive-train given the different overall likelihood functions, or in other words the determination of the Global Likelihood Function.

The following equation is used to calculate the global likelihood function GLF:

$$L(Y(t_i) \mid S(t_i)) = \prod_{c=1}^{C} L^c(Y^c(t_i) \mid S(t_i)) \quad (18)$$

where:
$L^c(Y^c(t_i)|S(t_i))$ represents the OLF of the component c of the drive-train,
c: 1, 2, 3, . . . , C and C is the total number of components in the drive-train being analyzed.

S5(3)—obtaining the last known global condition $p(t_{i-1}, S(t_{i-1}))$ of the drive-train under analysis.

The last known global condition $p(t_{i-1},S(t_{i-1}))$ represents the posterior probabilities of fault for the drive-train calculated in the immediate previous time instant $t_{i-1}$. These posterior probabilities are expressed as:

$$p(t_{i-1},S(t_{i-1})) = [p(Z_1(t_{i-1})) \, p(Z_2(t_{i-1})) \ldots p(Z_{R+1}(t_{i-1}))] \quad (19)$$

For the case when the current time instant is t=0, i=1, the last known condition is considered to be the initial probabilities of fault for the drive-train. Said initial probability can be defined through the use of the information database 12, and its information systems.

S5(4)—determination the global fault development model by using the last known global condition $p(t_{i-1}, S(t_{i-1}))$ and the information database 12 with its different information systems. This model is expressed as $$Q(S(t_i)|S(t_{i-1})) = [p(Z_1(t_i)|S(t_{i-1})) \, p(Z_2(t_i)|S(t_{i-1})) \ldots p(Z_{R+1}(t_{i-1}))] \quad (20)$$

and represents the expected probabilities of fault for the drive-train at a time instant $t_i$, based on the previous probabilities of fault of the drive-train at a time instant $t_{i-1}$. This model defines how the probabilities of a fault change over time, according to previously assessed conditions.

S5(5)—calculation of the prior probability of fault for the drive-train by using the last known global condition, $p(t_{i-1}, S(t_{i-1}))$, and the global fault development model $Q(S(t_i)|S(t_{i-1}))$.

The prior probability of fault for the drive-train, expressed as $p^-(t_i, S(t_i))$, is calculated using the global fault development model and the last known global condition, by the use of the following formula:

$$p^-(t_i, S(t_i)) = \int Q(S(t_i)|S(t_{i-1})) p(t_{i-1}, S(t_{i-1})) dS_{i-1} \quad (21)$$

where:

$dS_{i-1}$ is used to indicate integration with respect to the global condition state, $Q(S(t_i)|S(t_{i-1}))$ is the global fault development model Q assessed for the global condition S of the drive-train in the time instant $t_i$ given the global condition of the drive-train in the time instant $t_{i-1}$.

The global condition states are discrete, therefore equation (21) can be also expressed as:

$$p^-(t_i, S(t_i)) = Q(S(t_i)|S(t_{i-1})) \oplus p(t_{i-1}, S(t_{i-1})) \quad (22)$$

Where $\oplus$ represents the element-wise product, $$Q(S(t_i)|S(t_{i-1})) = [p(Z_1(t_i)|S(t_{i-1})) \, p(Z_2(t_i)|S(t_{i-1})) \ldots p(Z_{R+1}(t_i)|S(t_{i-1}))] \text{ and}$$

$$p(t_{i-1}, S(t_{i-1})) = [p(Z_1(t_{i-1})) \, p(Z_2(t_{i-1})) \ldots p(Z_{R+1}(t_{i-1}))].$$

S5(6)—obtaining the posterior probabilities of fault for the drive-train $p(t_i, S(t_i))$ The obtaining the posterior probabilities of fault for the drive-train is performed by fusing the data from the prior probabilities of fault for the drive-train, $p^-(t_i, S(t_i))$, with the global likelihood function, $L(Y(t_i)|S(t_i))$. Such data fusion process is conducted by applying Bayesian Inference, through the use of the following formula:

$$p(t_i, S(t_i)) = \frac{1}{B} L(Y(t_i) | S(t_i)) p^-(t_i, S(t_i)) \quad (23)$$

where the value of $p(t_i, S(t_i))$ is a distribution of non-normalized probabilities:

$$[p(Z_1(t_i)), p(Z_2(t_i)) \ldots p(Z_{R+1}(t_i))] \quad (24)$$

And B in equation (22) is the normalizing constant usually calculated as:

$$B = \sum_{r=1}^{R+1} p(Z_r(t_i)) \quad (25)$$

This posterior probabilities of fault for the drive-train would be considered as the last known global condition in the case the data fusion is conducted in a future time instant $t_{i+1}$.

S.6 Condition Assessment

The assessment of the health condition of the drive-train is performed by retrieving the posterior probabilities of fault for the drive-train calculated in the global data fusion module, and determining which fault is associated with the maximum posterior probability value from the following expression:

$$\operatorname*{argmax}_Z [p(Z_1(t_i)), p(Z_2(t_i)) \ldots p(Z_{R+1}(t_i))] \quad (26)$$

In the case that the maximum probability value corresponds to $p(Z_{R+1}(t_i))$, it means that the system is considered to be healthy ($Z_{R+1}$ is associated with the health condition). In any other cases the probability value will be directly linked with the fault $Z_r$, which will be the fault to be the most likely present in the drive-train.

BIBLIOGRAPHY

[1] Y. Bo-Suk and J. Kwang, "Application of Dempster-Shafer Theory in Fault Diagnosis of Induction Motors Using Vibration and Current Signals," *Mechanical Systems and Signal Processing*, vol. 20, pp. 403-420, 2006.

[2] C. Byington and e. al., "Fusion Techniques for Vibration and Oil/Debris quality in Gearbox Failure Testing," in *International Conference on Condition Monitoring*, Swansea, 1999.

[3] B.-S. Yang, D.-S. Lim and A. C. C. Tan, "VIBEX: An expert system for vibration fault diagnosis of rotating machinery using decision tree and decision table," *Expert Systems with Applications*, vol. 28, pp. 735-742, 2005.

What is claimed is:

1. A method for condition monitoring of a distributed drive-train that considers al parts thereof to avoid false alarms comprising:
   measuring physical signals obtained from sensors attached to a plurality of components of a distributed drive-train, wherein said plurality of components comprise an electric motor, a gearbox, a load, and their combination, said sensors being connected to said plurality of components of said distributed drive-train,
   delivering said measured physical signals to a computer device to process data included in said measured physical signals; and
   performing data fusion processes in said computer device using data from an information database containing at least one information system, said computer device comprising two stages of data fusion processes,
   determining in a first stage a local posterior probability of fault $p^c(t_i, s^c(t_i))$ of the individual components comprising the electric motor, the gearbox, and the load of said distributed drive-train, using a local Bayesian Inference according to a formula:

$$p^c(t_i, s^c(t_i)) = \frac{1}{A} L^c(y^c(t_i) | s^c(t_i)) p^{c-}(t_i, s^c(t_i))$$

where;

$t_i$ is a time instant, $s^c(t_i)$ is a component condition s at a time instant $t_i$, c: 1, 2, 3, ..., C, and C is a number of components in said distributed drive-train, $p^{c-}(t_i,s^c(t_i))$ is a prior probability of fault for an individual component c, wherein each individual component has a plurality of different fault types, $L^c(y^c(t_i)|s^c(t_i))$ is a component likelihood function (CLF) for the individual component c based on said plurality of different fault types, $y^c(t_i)$ is a vector of indicator values of the component c at the time instant $t_i$, A is a normalizing constant, and determining in a second stage a global posterior probability of fault $p(t_i,S(t_i))$ of all said individual components of said distributed drive-train, using a global Bayesian inference according to a formula:

$$p(t_i, S(t_i)) = \frac{1}{B} L(Y(t_i) | S(t_i)) p^-(t_i, S(t_i))$$

where:

$t_i$ is a time instant, $S(t_i)$ is a global condition S of said distributed drive-train in the time instant $t_i$ where S corresponds to different types of faults of said distributed drive train, $p^-(t_i,S(t_i))$ is a prior probability of fault for said distributed drive-train, $Y(t_i)$ is a vector of local posterior probabilities of fault for all said components in said distributed drive-train, at the time instant $t_i$, $L(Y(t_i)|S(t_i))$ is a global likelihood function (GLF) for the different types of fault of said distributed drive-train obtained by multiplying a different set of overall likelihood functions (OLF) of said distributed drive-train $\Pi_{c=1}^C L^c(Y^c(t_i)|S(t_i))$, where $Y^c(t_i)$ is equal to said local posterior probability of fault for the individual component c defined as $p^c(t_i,s^c(t_i))$, for said plurality of different fault types, B is a normalizing constant, and assessing the condition of said distributed drive-train based on determined values of said global posterior probability of fault $p(t_i,S(t_i))$ by choosing a maximum value from the global posterior probability of fault $p(t_i,S(t_i))$ which maximum value serves as an indicator for the most likely fault present in said distributed drive-train and triggering an alarm for said distributed drive-train by detecting possible interactions between said distributed drive-train components based on the global posterior probability of all said individual components of said distributed drive-train.

2. A method according to claim 1, further comprising calculating the prior probability of fault for said individual component (c), $p^{c-}(t_i,s^c(t_i))$ using the component last known condition and a component fault development model.

3. A method according to claim 1, further comprising calculating the prior probability of fault for said distributed drive-train $p^-(t_i,S(t_i))$ using a last known global condition and a global fault development model.

4. A method according to claim 1, further comprising selecting the at least one information system, contained in the information data base, from the group consisting of an Expert Knowledge System (EKS), a Component Life Time Estimation System (CLTES), an Equipment Operating Condition Information System (EOCS), and any combination thereof.

5. A method according to claim 1, further comprising calculating the global likelihood function (GLF) in a global data fusion module for at least two components from said distributed drive-train.

6. A method according to claim 5, further comprising calculating the data for the global likelihood function (GLF) from signals measured and processed for said electric motor, said gearbox, said load, or their combination.

* * * * *

UNITED STATES PATENT AND TRADEMARK OFFICE
CERTIFICATE OF CORRECTION

PATENT NO. : 10,621,501 B2  Page 1 of 1
APPLICATION NO. : 14/909788
DATED : April 14, 2020
INVENTOR(S) : Victor-Hugo Jaramillo-Velasquez et al.

It is certified that error appears in the above-identified patent and that said Letters Patent is hereby corrected as shown below:

In the Claims

In Column 17, Line 42 Claim 1, the formula "$\Pi_{c=1}{}^c L^c(Y^c(t_i)|S(t_i))$" should read -- $\prod_{c=1}^{C} L^c(Y^c(t_i)|S(t_i))$ --.

Signed and Sealed this
Fourth Day of August, 2020

Andrei Iancu
*Director of the United States Patent and Trademark Office*